(12) United States Patent
Lee et al.

(10) Patent No.: US 12,340,671 B2
(45) Date of Patent: Jun. 24, 2025

(54) METHOD FOR MONITORING STATE OF WEARING SAFETY PROTECTIVE EQUIPMENT AND SERVER FOR PROVIDING THE METHOD

(71) Applicants: POSCO Co., Ltd, Pohang-si (KR); RESEARCH INSTITUTE OF INDUSTRIAL SCIENCE & TECHNOLOGY, Pohang-si (KR); POSTECH Research and Business Development Foundation, Pohang-si (KR)

(72) Inventors: Jinwoo Lee, Hwaseong-si (KR); Daijin Kim, Pohang-si (KR); Dongmin Cha, Pohang-si (KR); Joonyeon Lee, Pohang-si (KR); Geon Tae Ahn, Pohang-si (KR); Hyeongjin Jeon, Pohang-si (KR)

(73) Assignees: POSCO CO., LTD, Pohang-si (KR); RESEARCH INSTITUTE OF INDUSTRIAL SCIENCE & TECHNOLOGY, Pohang-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 267 days.

(21) Appl. No.: 18/085,043

(22) Filed: Dec. 20, 2022

(65) Prior Publication Data
US 2023/0196895 A1   Jun. 22, 2023

(30) Foreign Application Priority Data

Dec. 21, 2021 (KR) .......................... 10-2021-0184162

(51) Int. Cl.
*G08B 21/02* (2006.01)
*G06N 3/0475* (2023.01)
(Continued)

(52) U.S. Cl.
CPC .............. *G08B 21/02* (2013.01); *G06T 7/20* (2013.01); *G06V 10/82* (2022.01); *G06V 20/52* (2022.01);
(Continued)

(58) Field of Classification Search
CPC ...................................................... G08B 21/02
See application file for complete search history.

(56) References Cited

U.S. PATENT DOCUMENTS

2009/0089108 A1*  4/2009  Angell ............... G06Q 10/0635
                                                     705/7.28
2014/0307076 A1* 10/2014  Deutsch .................. G06V 10/56
                                                       348/77

(Continued)

FOREIGN PATENT DOCUMENTS

JP    2010-198207 A    9/2010
JP    2017-114652 A    6/2017
(Continued)

*Primary Examiner* — Joseph H Feild
*Assistant Examiner* — Pameshanand Mahase
(74) *Attorney, Agent, or Firm* — Morgan Lewis & Bockius LLP (57) ABSTRACT

A method for monitoring a state of wearing safety protective equipment according to an embodiment includes receiving an image from a site monitoring device installed at an operation site determining whether a work performed in a monitoring area corresponds to a dangerous work by analyzing the image; detecting a target worker and a body area of the target worker when it is determined that the work corresponds to the dangerous work as a result of determining whether the work performed in the monitoring area corresponds to the dangerous work; determining a type of safety (Continued)

protective equipment required for the target worker; and determining the state of the target worker wearing the safety protective equipment.

17 Claims, 4 Drawing Sheets

(51) Int. Cl.
  *G06Q 10/0635* (2023.01)
  *G06T 7/20* (2017.01)
  *G06V 10/82* (2022.01)
  *G06V 20/52* (2022.01)
  *G06V 40/10* (2022.01)
  *G08B 7/06* (2006.01)
(52) U.S. Cl.
  CPC .............. *G06V 40/10* (2022.01); *G08B 7/06* (2013.01); *G06T 2207/20081* (2013.01); *G06T 2207/20084* (2013.01); *G06T 2207/30196* (2013.01); *G06T 2207/30232* (2013.01); *G06V 2201/07* (2022.01)

(56) References Cited

U.S. PATENT DOCUMENTS

2016/0104046 A1\* 4/2016 Doettling ............... F16M 13/02
                                                              382/103
2018/0322754 A1\* 11/2018 Rahman .................. H04W 4/38
2021/0232800 A1\* 7/2021 Wohlfeld ............ G06F 18/2155

FOREIGN PATENT DOCUMENTS

| KR | 10-2015-0047656 A | 5/2015 |
| KR | 10-2017-0027060 A | 3/2017 |
| KR | 10-2201405 B1 | 1/2021 |
| KR | 10-2329894 B1 | 11/2021 |

\* cited by examiner

METHOD FOR MONITORING STATE OF WEARING SAFETY PROTECTIVE EQUIPMENT AND SERVER FOR PROVIDING THE METHOD

CROSS-REFERENCE TO RELATED APPLICATION

This application claims priority to and the benefit of Korean Patent Application No. 10-2021-0184162 filed in the Korean Intellectual Property Office on Dec. 21, 2021, the entire contents of which are incorporated herein by reference.

BACKGROUND OF THE INVENTION

(a) Field of the Invention

The present disclosure relates to a method for monitoring a state of wearing safety protective equipment and a server for providing the method.

(b) Description of the Related Art

In general, since many workers simultaneously perform multiple works in industrial sites, operation sites, etc., safety accidents due to various risk factors inherent in the site and minor negligence of workers frequently occur. Safety protective equipment is basic protective equipment worn by workers to prevent danger and disaster, and includes, for example, a safety helmet, a safety belt, protective gloves, a gas mask, protective boots, etc.

On the other hand, workers who perform hazardous work, such as places where chemical products are handled, must legally wear safety protective equipment suitable for the situation. However, in order to monitor this, a number of CCTVs are installed at the operation site, and a separate monitor is placed for monitoring at all times, but it is difficult to monitor all situations in reality.

Therefore, it is required to develop a technology capable of determining a wearing state of safety protective equipment of a worker appearing on a screen at a highly reliable result through CCTV images using an artificial intelligence network.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present disclosure has been made in an effort to determine a state of a worker wearing safety protective equipment using an artificial intelligence network during image processing.

The present disclosure is to set a starting condition for detecting a worker in a photographed image, and to determine a state of the worker wearing safety protective equipment only when the condition is satisfied.

The present disclosure is to more accurately determine a state of a worker wearing safety protective equipment.

A method for monitoring a state of wearing safety protective equipment according to an embodiment includes receiving an image from a site monitoring device installed at an operation site; determining whether a work performed in a monitoring area corresponds to a dangerous work by analyzing the image; detecting a target worker and a body area of the target worker when it is determined that the work corresponds to the dangerous work as a result of determining whether the work performed in the monitoring area corresponds to the dangerous work; determining a type of safety protective equipment required for the target worker; and determining the state of the target worker wearing the safety protective equipment.

A body area of the target worker may include a head area and a body area, and the determining of the type of the safety protective equipment required for the target worker may include determining the type of the safety protective equipment required for each of the head area and the body area of the target worker.

The determining of the state of the target worker wearing the safety protective equipment may include determining the state of the target worker wearing the safety protective equipment at every moment when the target worker performs a work, accumulating and storing determination result data based on a result of the determination, and finally determining the state of the target worker wearing the safety protective equipment based on the accumulated determination result data.

The determining of the state of the target worker wearing the safety protective equipment may further include mapping information for determining the state of the target worker wearing the safety protective equipment to the target worker, and monitoring the target worker using a tracking algorithm.

The method may further include, as a result of determining the state of the target worker wearing the safety protective equipment, when the state of the target worker wearing the safety protective equipment is inappropriate, transmitting an alarm to an output device.

Monitoring the state of wearing the safety protective equipment may be performed using an artificial intelligence network, and the artificial intelligence network may include an object detection network, a classification network, and a decision making network.

A server for monitoring a state of wearing safety protective equipment according to an embodiment includes a communication module configured to receive an image from a site monitoring device installed at an operation site; and a control module configured to determine whether a work performed in a monitoring area corresponds to a dangerous work by analyzing the image, detect a target worker and a body area of the target worker when it is determined that the work corresponds to the dangerous work as a result of determining whether the work performed in the monitoring area corresponds to the dangerous work, determine a type of safety protective equipment required for the target worker, and determine the state of the target worker wearing the safety protective equipment.

A body area of the target worker may include a head area and a body area, and the control module is configured to determine the type of the safety protective equipment required for each of the head area and the body area of the target worker.

The control module may determine the state of the target worker wearing the safety protective equipment at every moment when the target worker performs a work, accumulate and store determination result data based on a result of the determination, and finally determine the state of the target worker wearing the safety protective equipment based on the accumulated determination result data.

The control module may determine the state of the target worker wearing the safety protective equipment by mapping information for determining the state of the target worker wearing the safety protective equipment to the target worker, and monitoring the target worker using a tracking algorithm.

The control module may transmit an alarm to an output device when the state of the target worker wearing the safety protective equipment is inappropriate.

Monitoring the state of wearing the safety protective equipment may be performed using an artificial intelligence network, and the artificial intelligence network may include an object detection network, a classification network, and a decision making network.

A system for monitoring a state of wearing safety protective equipment according to an embodiment includes a site monitoring device installed at an operation site and configured to photograph an image; an output device configured to notify a worker of a danger; and a server configured to determine whether a work performed in a monitoring area corresponds to a dangerous work by analyzing the image, detect a target worker and a body area of the target worker when it is determined that the work corresponds to the dangerous work as a result of determining whether the work performed in the monitoring area corresponds to the dangerous work, determine a type of safety protective equipment required for the target worker, determine the state of the target worker wearing the safety protective equipment, and transmit an alarm to the output device when the state of the target worker wearing the safety protective equipment is inappropriate.

A body area of the target worker may include a head area and a body area, and the server is configured to determine the type of the safety protective equipment required for each of the head area and the body area of the target worker.

The server may determine the state of the target worker wearing the safety protective equipment at every moment when the target worker performs a work, accumulate and store determination result data based on a result of the determination, and finally determine the state of the target worker wearing the safety protective equipment based on the accumulated determination result data.

The server may determine the state of the target worker wearing the safety protective equipment by mapping information for determining the state of the target worker wearing the safety protective equipment to the target worker, and monitoring the target worker using a tracking algorithm.

Monitoring the state of wearing the safety protective equipment may be performed using an artificial intelligence network, and The artificial intelligence network may include an object detection network, a classification network, and a decision making network.

A program according to an embodiment may be stored on a recording medium to perform a method for monitoring a state of wearing safety protective equipment.

A recording medium according to an embodiment may store thereon a program for performing a method for monitoring a state of wearing safety protective equipment.

According to at least one of the embodiments according to the present disclosure, there is an advantage of efficiently determining whether a worker is wearing safety protective equipment in a plurality of site monitoring devices even with limited computing resources.

According to at least one of the embodiments according to the present disclosure, there is an advantage of more accurately determining a state of a worker wearing safety protective equipment.

According to at least one of the embodiments according to the present disclosure, there is an advantage of correctly detecting a worker and determining a state of a worker wearing safety protective equipment even when the worker's body part is covered or it is difficult to detect the worker due to a posture change.

DETAILED DESCRIPTION OF THE EMBODIMENTS

Hereinafter, the embodiments disclosed in the present specification will be described in detail with reference to the accompanying drawings, but the same or similar reference numerals will be given to the same or similar components, and redundant descriptions thereof will be omitted. The suffixes "module" and "unit" for components used in the following description are given or used together in consideration of ease of writing the specification, and do not have meanings or roles that are distinct from each other by themselves. In addition, in describing the embodiments disclosed in the present specification, if it is determined that detailed descriptions of related known technologies may obscure the gist of the embodiments disclosed in the present specification, the detailed descriptions thereof will be omitted. In addition, it should be understood that the accompanying drawings are only for easy understanding of the embodiments disclosed in the present specification, the technical idea disclosed in the present specification is not limited by the accompanying drawings, and all modifications, equivalents, or substitutes included in the spirit and technical scope of the present invention are included in the accompanying drawings.

As used herein, it should be understood that terms such as "comprise" or "have" are intended to indicate the presence of a feature, number, step, operation, component, part, or combinations thereof described in the specification, but the presence or addition of one or more other features, numbers, steps, operations, components, parts, or combinations thereof is not precluded.

Hereinafter, embodiments of the present invention will be described in detail with reference to the accompanying drawings.

Figure 1:
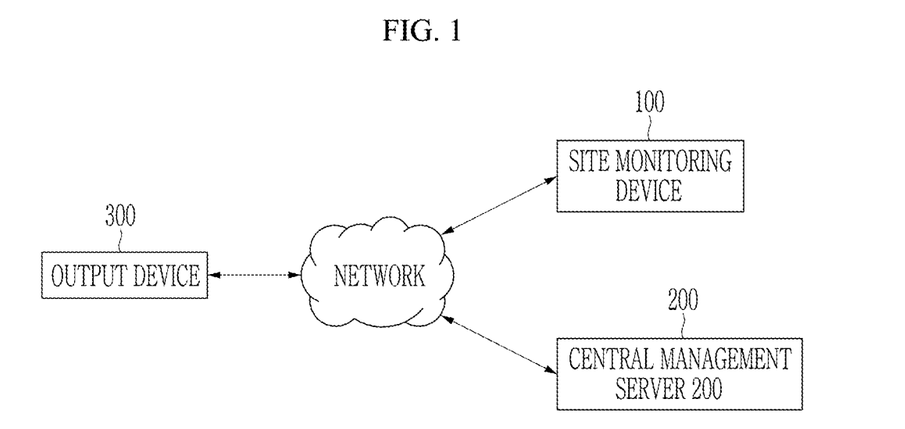
FIG. 1 is a schematic block diagram illustrating a site monitoring device, a central management server, and an output device.

FIG. 1 is a schematic block diagram illustrating a site monitoring device, a central management server, and an output device.

The site monitoring device 100, the central management server 200, and the output device 300 may be connected through a network.

In the present invention, a network refers to a connection structure capable of exchanging information between nodes such as devices and servers, and examples of such a network include a local area network (LAN), a wide area network (WAN), broadband network (BBN), wireless LAN (WLAN), Long Term Evolution (LTE), LTE Advanced (LTE-A), Code-Division Multiple Access (CDMA), Wideband Code Division Multiplex Access (WCDMA), Universal Mobile Telecommunication System (UMTS), Wireless Broadband (WiBro), Global System for Mobile Communications (GSM), Bluetooth Low Energy (BLE), Bluetooth, Zigbee, Ultra-WideBand (UWB), ANT, Wi-fi, infrared data association (IrDA), Personal Area Network (PAN), etc., but are not limited thereto.

The site monitoring device 100 is a device for monitoring workers in an operation site, and may include various types of cameras having image sensors such as a Charge Coupled Device (CCD) and a Complementary Metal Oxide Semiconductor (CMOS). The image sensor may be an infrared sensor that may easily identify a human body and an object even at night or in an environment where it is difficult to identify surroundings.

One or more site monitoring devices 100 may also be installed in the operation site. Here, the site monitoring device 100 is described as being installed at a predetermined location in the operation site, but is not limited thereto, and may be a mobile terminal device such as a smart phone or a tablet PC owned by a worker and/or a safety manager at the operation site.

The site monitoring device 100 may obtain images of a worker in a monitoring area of an operation site and an operation environment in real time. The images of the operation environment may be, for example, photographed images of a surrounding environment in which the worker is working, safety protective equipment worn by the worker, buildings and work facilities located at the work site, etc. The site monitoring device 100 may also obtain environment information that changes as the operation proceeds.

In the present specification, "workers" refer to all workers identified in an image unless otherwise specified, and a "target worker" refers to a worker to be monitored among the workers. The central management server 200 may randomly select the target worker from among workers.

The site monitoring device 100 may provide the obtained image to the central management server 200 through a network.

The central management server 200 is a server for warning a worker when a work in progress at the operation site is a dangerous work, may analyze an image received from the site monitoring device 100 to determine whether the work is dangerous, and, when the work corresponds to the dangerous work, detect the target worker, a head area and a body area of the target worker.

In this case, the head area refers to a area corresponding to the head of a human body, and the body area refers to a area including the upper body, the lower body, and feet of the human body except for the head.

The central management server 200 may also determine a state of the target worker wearing safety protective equipment.

The central management server 200 may transmit an alarm to the output device 300 when the state of the target worker wearing the safety protective equipment is inappropriate.

In addition, the central management server 200 may warn the worker when the state of the target worker wearing the safety protective equipment is inappropriate.

The output device 300 may be a device that generates an alarm sound such as a buzzer or siren according to a result determined by the central management server 200, an audio providing device that outputs a voice signal notifying danger through a speaker, a light output device that outputs a light visually indicating danger, and/or a display that outputs an image signal including a guide phrase. Such an output device 300 may be installed at a predetermined location in the operation site.

Also, the output device 300 may be a safety manager terminal. Here, the safety manager terminal is a mobile device equipped with a safety manager, and a worker terminal to be described later is a mobile device equipped with the target worker. Each terminal is equipped with a program related to the operation site. The safety manager terminal may access the central management server 200 and view an image received from the site monitoring device 100 in real time.

When receiving an alarm from the central management server 200, the output device 300 may output the alarm through the output device 300 at a location closest to the target worker. In addition, all output devices 300 may output the alarm in the form of an entire broadcast that may be heard by all personnel located in the operation site.

Figure 2:
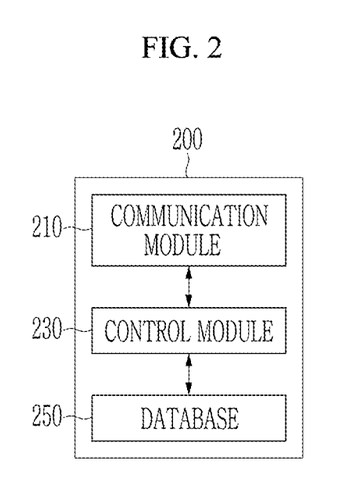
FIG. 2 is a schematic block diagram illustrating an internal configuration of a central management server.

However, since noise may be severe due to the nature of the operation site, the alarm may be preferably transmitted to the safety manager terminal and/or the worker terminal. The safety manager terminal and the worker terminal receive the alarm from the central management server 200 through a network, and each terminal displays the received alarm on a screen. The safety manager and/or the worker are alerted to the safety protective equipment by the alarm during work, and thus, the stability of the operation site is improved. FIG. 2 is a schematic block diagram illustrating an internal configuration of a central management server.

The central management server 200 includes a communication module 210, a control module 230 and a database 250.

The communication module 210 is for communicating with the site monitoring device 100 and the output device 300 through a network. The communication module 210 may transfer data received from the site monitoring device 100 and/or the output device 300 to the control module 230, or transmit data received from the control module 230 to the output device 300 through the network.

The control module 230 is for processing the data received from the communication module 210 and data stored in the database 250. The control module 230 may use an artificial neural network when analyzing an image received from the communication module 210 to determine whether a work is a dangerous work, detecting a target worker and a target worker's body, and determining a state of the target worker wearing of safety protective equipment.

The artificial neural network may include a plurality of layers, and the plurality of layers may include a convolution layer that performs a convolution operation, a pooling layer that performs a downsampling operation, an unpooling layer (UL) that performs an upsampling operation, a deconvolution layer (DL) that performs a deconvolution operation, etc. Also, the plurality of layers may include at least two classification layers connected through a plurality of calculations to which weights are applied.

The control module 230 may use the artificial intelligence network. The artificial intelligence network may include an object detection network, a classification network, and a decision making network.

Here, the object detection network is a random artificial intelligence network trained to perform object detection. For example, the object detection network may be used for the control module 230 to detect the target worker, a head area, and a body area of the target worker when a dangerous task is performed in a monitoring area.

The classification network is a random artificial intelligence network trained to perform classification. For example, the classification network may be used for the control module 230 to determine a type of safety protective equipment required for each of the detected head area and body area of the target worker.

The decision making network is a random artificial intelligence network trained to perform decision making. For example, the decision making network may be used for the control module 230 to finally determine the state of the target worker wearing the safety protective equipment.

The control module 230 may perform an element sum operation between feature maps extracted from the respective layers of the artificial neural network so that information in other layers may be referred to, and may use images of a small-sized object and a large-size object for training the artificial neural network so that objects may be well detected even with various size changes.

The control module 230 may determine whether a dangerous work is performed in a monitoring area.

The monitoring area is a target area for the control module 230 to determine whether a dangerous task is performed, and may be set by dividing into an area entering a dangerous work and an area where the dangerous work is performed. In addition, at least one monitoring area may be set within the operation site.

For example, the area where the dangerous work is performed may be a place where a work target such as a valve is actually operated, and the area entering the dangerous work may be a safety fence or a door of the area where the dangerous work is performed.

The monitoring area may be set in advance and stored in the database 250.

The dangerous work is separately classifying certain types of work with a high risk of accidents, such as a work handling chemical products, and information about the type of work classified as the dangerous work may be set in advance and stored in the database 250.

When it is determined that the dangerous work is performed in the monitoring area, the control module 230 may detect the target worker, the head area, and the body area of the target worker. When it is determined that the work performed at the operation site does not correspond to the dangerous work, the control module 230 ends the determination of the state of wearing the safety protective equipment without detecting the target worker.

The control module 230 may detect the target worker, the head area, and the body area of the target worker within the image received from the site monitoring device 100 through the communication module 210 using the artificial neural network.

For example, the artificial neural network may use a generative adversarial net (GAN) model. A GAN is a neural network that may generate an image similar to the original image while simultaneously training two adversarial neural networks. The control module 230 may more accurately detect the safety protective equipment by using the GAN previously trained with safety protective equipment images of different sizes. The control module 230 may determine whether the accuracy of a classification result is greater than or equal to a preset reference value and less than the reference value, and when the accuracy is less than the reference value, reflect the classification result to a generation model and optimize the generation model. Here, optimization means adjusting a weight value of each layer of the artificial neural network by reflecting the classification result.

The control module 230 may train the generation model and the classification model until the accuracy of the classification result becomes equal to or greater than the reference value. When training of the GAN is completed, the image received through the communication module 210 is input to the control module 230, thereby detecting an object present in the image.

The control module 230 may detect the safety protective equipment worn by the worker by using human body modeling data of the worker stored in the database 250 and information about the safety protective equipment detectable from each of the head and body areas. That is, the control module 230 may more accurately detect the safety protective equipment by detecting the worker, detecting the head area and the body area of the detected worker, and detecting the safety protective equipment dependent on each of the detected head area and body area of the worker.

The control module 230 may analyze the image received from the site monitoring device 100 through the communication module 210 to determine the type of safety protective equipment required for each of the head area and body area of the target worker.

For example, in the case of a work where there is a danger of an object falling or flying or a danger of a worker falling during the dangerous work, the target worker is required to wear a safety helmet on the head. As another example, in the case of a work where there is a danger of getting hit by a falling object or getting caught in an object, or a danger of an electric shock or an electrostatic charge during the dangerous work, the target worker is required to wear safety shoes on the feet belonging to the body area. Information about the safety protective equipment required for the head area and the body area according to the type of the dangerous work may be stored in the database 250.

The control module 230 may determine the state of the target worker wearing the safety protective equipment using the artificial neural network. The control module 230 generates an alarm when types of safety protective equipment required for the target worker are not all included in the safety protective equipment worn by the target worker and/or when the safety protective equipment is detected in an incorrect location. The alarm may include information about what type of safety protective equipment the target worker should wear and information about how to wear the safety protective equipment.

The control module 230 may detect the target worker by mapping the information for determining the state of the target worker wearing the safety protective equipment stored in the database 250 to the corresponding target worker even when a target worker's body part is covered or it is difficult to detect the target worker due to a posture change, and monitoring the target worker using a tracking algorithm.

The database 250 may store various information necessary to check the safety of the operation site, such as image data received from the site monitoring device 100, information about the monitoring area, information about types of tasks classified as the dangerous task, human body modeling data of workers, information about the safety protective equipment required for the head area and the body area according to the type of the dangerous task, information about results of the control module 230 determining the state of the target worker wearing the safety protective equipment related to the head area and the body area of the target worker at every moment when the target worker performs the task, and information about the output device 300, etc.

Here, the database 250 has been described as being located within the central management server 200, but may be a separate database located outside the central management server 200.

In addition, the database 250 stores information for finally determining the state of the target worker wearing the safety protective equipment based on result data of determining the state of the target worker wearing the safety protective equipment related to the head area and the body area of the target worker at every moment when the target worker performs the task.

Figure 3:
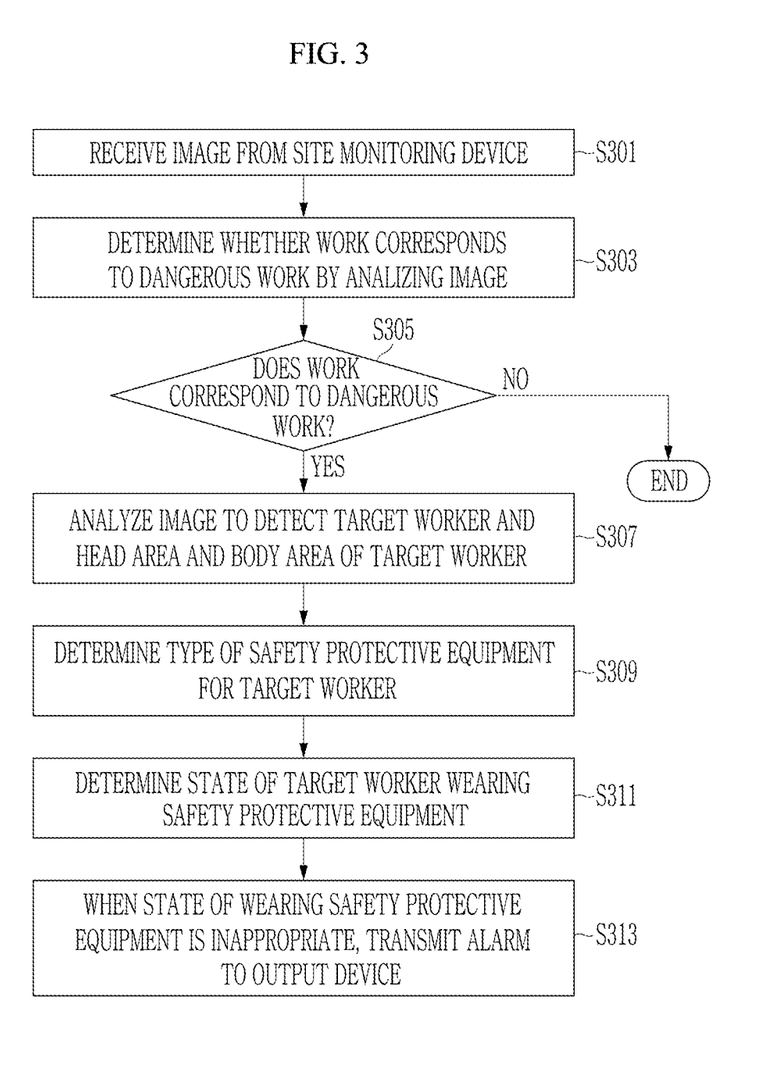
FIG. 3 is a flowchart schematically illustrating a method for monitoring a state of wearing safety protective equipment performed in a central management server.

FIG. 3 is a flowchart schematically illustrating a method for determining a state of wearing safety protective equipment performed in a central management server.

First, the central management server 200 receives an image from the site monitoring device 100 (S301). One or more site monitoring devices 100 may be located in the operation site, and photograph images and transmit the images to the central management server 200 in real time.

The central management server 200 determines whether a work performed in a monitoring area corresponds to a dangerous work by analyzing the image received from the site monitoring device 100 (S303).

For example, the central management server 200 may determine whether the work performed in the monitoring area corresponds to the dangerous work through an edge detection method, which is a method of finding a part of the image of the monitoring area where a brightness value around a specific pixel rapidly changes. Specifically, the central management server 200 may set an area covered when the dangerous work is performed as the monitoring area and determine that the dangerous work is performed when a brightness value around the area rapidly changes.

As another example, the central management server 200 may determine whether the work performed in the monitoring area corresponds to the dangerous work through a method of finding a part of the image of the monitoring area where brightness values of all pixels rapidly change. Specifically, the central management server 200 may determine whether the dangerous task is being performed by recognizing a brightness change occurred, such as when a door is opened to enter indoors where the dangerous task is being performed from the outside.

As another example, the central management server 200 may determine whether the work performed in the monitoring area corresponds to the dangerous work using an artificial intelligence network. Specifically, the central management server 200 may learn images when the dangerous work is performed and when the dangerous work is not performed through the artificial intelligence network, and determine whether the dangerous work is being performed using the learned images.

The central management server 200 detects a target worker when the work performed in the monitoring area corresponds to the dangerous work (S305) as a result of determining whether the work performed in the monitoring area corresponds to the dangerous work. The central management server 200 ends a process of determining the state of wearing the safety protective equipment when the work performed in the monitoring area does not correspond to the dangerous work as a result of determining whether the work performed in the monitoring area corresponds to the dangerous work.

The central management server 200 analyzes the received image and detects the target worker, a head area and a body area of the target worker (S307).

For example, the central management server 200 may detect the target worker, the head area and the body area of the target worker using an artificial neural network previously trained with images of safety protective equipment of different sizes.

At this time, the central management server 200 may use an object detection network.

The central management server 200 determines the type of safety protective equipment required for the target worker (S309).

Here, the central management server 200 may determine the type of safety protective equipment required for the target worker based on the type of the dangerous work determined in step S303.

In addition, for example, the central management server 200 may determine the type of safety protective equipment required for the head area and the body area of the target worker using information about the safety protective equipment required for each of the head area and the body area according to the work type stored in the database 250.

At this time, the central management server 200 may use a classification network.

Thereafter, the central management server 200 determines the state of the target worker wearing the safety protective equipment (S311).

For example, the central management server 200 may compare the safety protective equipment determined to be worn from the target worker, the head area, and body area of the target worker detected in step S307 with the type of the safety protective equipment determined to be required for each of the head area and the body area of the target worker in step S309. When the safety protective equipment worn by the target worker in the head area and the body area does not include all types of safety protective equipment required for the target worker, the central management server 200 may determine that the state of the target worker wearing the safety protective equipment is inappropriate.

Specifically, the central management server 200 may detect the head area and the body area of the target worker, and then determine the safety protective equipment worn on the head and the safety protective equipment worn on the body, respectively, and determine a 'head wearing a helmet' and a 'body wearing safety boots'. Thereafter, the central management server 200 may compare the state of the target worker wearing the safety protective equipment with the type of safety protective equipment required for each of the head area and body area of the target worker.

In addition, for example, the central management server 200 may determine the state of the target worker wearing the safety protective equipment at every moment when the target worker performs the work using an artificial intelligence network, and accumulates and stores result data in the database 250. The central management server 200 may finally determine the state of the target worker wearing the safety protective equipment based on the accumulated determination result data and store the state in the database 250. In this case, the number of accumulated data used for determination may be set in advance.

The central management server 200 may map information for determining the state of the target worker wearing the safety protective equipment stored in the database 250 to the corresponding target worker, and monitor the target worker using a tracking algorithm. Through this, even when the target worker is covered by an obstacle, etc., it is possible to correctly determine the state of the target worker wearing the safety protective equipment.

At this time, the central management server 200 may use a decision making network.

When the state of wearing the safety protective equipment is inappropriate, the central management server 200 transmits an alarm to the output device 300 (S313).

Figure 4:
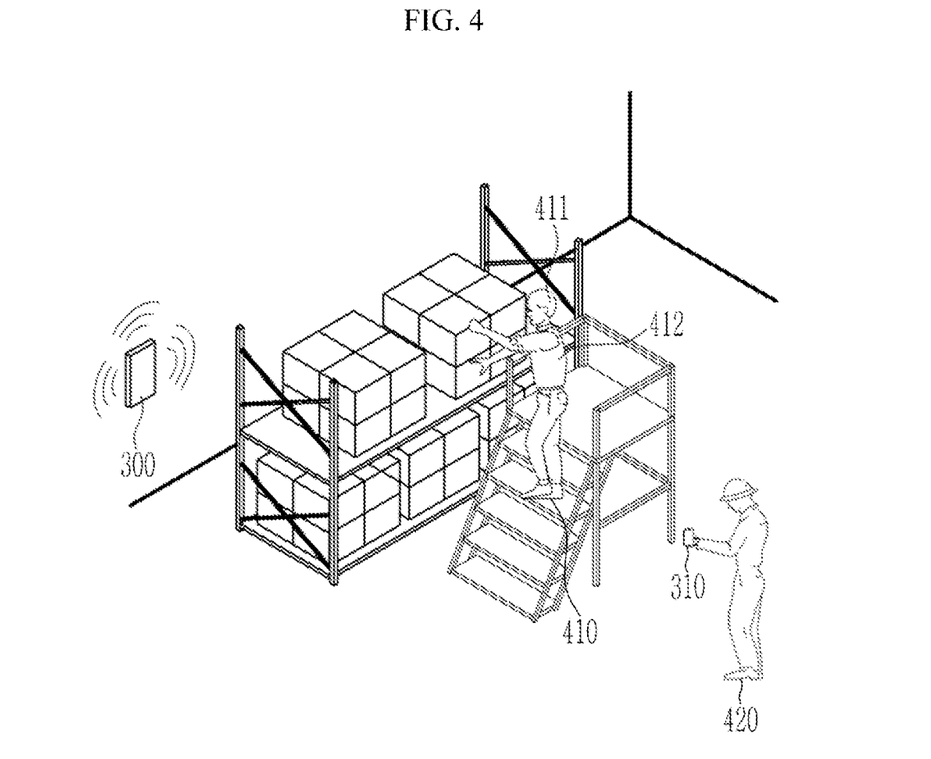
FIG. 4 is an exemplary diagram illustrating an image received by a central management server.

FIG. 4 is an exemplary diagram illustrating an image received by a central management server. Hereinafter, referring to FIG. 4, a method, performed by the central management server 200, for monitoring a state of wearing safety protective equipment will be described.

An operation site of FIG. 4 may be a place where work is performed at a high place using a ladder. Since a heights work is a dangerous work, the operation site of FIG. 4 is an area in which the dangerous work is performed and may be set in advance as a monitoring area in the central management server 200.

The central management server 200 may analyze an image and determine that the dangerous work is being performed when a worker starts the heights work and a brightness value around the place where the work is performed rapidly changes.

In addition, the central management server 200 may analyze an image and determine that the dangerous work is being performed when the worker performs the heights work using images when a ladder work learned through an artificial intelligence network is performed and when the ladder work is not performed.

The central management server 200 detects a target worker, a head area, and a body area of the target worker when it is determined that the dangerous work is being performed at the operation site.

The central management server 200 may detect a first worker 410 and a second worker 420 from the image. Here, it is assumed that the first worker 410 is a target worker and the second worker 420 is a safety manager.

The central management server 200 detects the first worker 410 and a head area and a body area of the first worker 410. Thereafter, the central management server 200 detects safety protective equipment worn by the first worker 410 on each of the head area and the body area. Here, since the first worker 410 is not wearing any safety protective equipment, no safety protective equipment is detected from a head area 411 of the first worker 410. Likewise, no safety protective equipment is detected in a body area 412 of the first worker 410.

The central management server 200 determines a type of safety protective equipment required for the target worker at the operation site in the image based on information about the safety protective equipment required for the head area and the body area according to the type of the dangerous work stored in the database 250.

First, since the work type is the ladder work, the central management server 200 may determine that the type of safety protective equipment required for the first worker 410, which is the target worker, includes a safety helmet.

After determining that the type of safety protective equipment required for the target worker is the safety helmet, the central management server 200 determines the state of the first worker 410 wearing the safety protective equipment in comparison with the detected safety protective equipment worn by the first worker 410 on the head area and the body area. Since the first worker 410 is not wearing the safety helmet on the head area 411, the central management server 200 determines that the state of the first worker 410 wearing the safety protective equipment is inappropriate.

The central management server 200 accumulates and stores result data obtained by determining the state of the first worker 410 wearing the safety protective equipment in the database 250. The central management server 200 determines the state of the first worker 410 wearing the safety protective equipment at the next moment in the same process as described above, and accumulates and stores result data in the database 250.

When the number of accumulated data reaches a preset number, the central management server 200 finally determines that the state of the first worker 410 wearing the safety protective equipment is inappropriate because the helmet is not worn based on the accumulated determination result data and stores the determination in the database 250.

The central management server 200 maps information for determining the state of the first worker 410 wearing the safety protective equipment stored in the database 250 to the first worker 410 and monitor the first worker 410 using a tracking algorithm. Through this, even when the first worker 410 is covered by an obstacle, etc., the central management server 200 may correctly determine the state of the first worker 410 wearing the safety protective equipment.

Then, the central management server 200 transmits an alarm to the output device 300. The alarm may include information that the first worker 410 should wear the safety helmet on the head area 411.

In addition, the central management server 200 may transmit an alarm to the safety manager terminal 310 of the second worker 420. The safety manager terminal 310 may receive notification information to guide the first worker 410 to wear the safety helmet.

According to a server for monitoring the state of wearing the safety equipment wearing according to the present disclosure, it is possible to efficiently determine whether a worker is wearing the safety protective equipment in a plurality of site monitoring devices even with limited computing resources by setting a starting condition for detecting the worker in a photographed image, and starting determining a state of the worker wearing safety protective equipment only when the condition is satisfied.

In addition, according to the server for monitoring the state of wearing the safety equipment wearing according to the present disclosure, it is possible to more accurately determine the state of the worker wearing the safety protective equipment by distinguishing the head area and the body area of the worker and detecting the safety protective equipment of each part.

According to the server for monitoring the state of wearing the safety equipment wearing according to the present disclosure, it is possible to correctly detect the worker and determine the state of the worker wearing the safety protective equipment by monitoring the worker using the tracking algorithm even when the worker's body part is covered or it is difficult to detect the worker due to a posture change.

In addition, according to the server for monitoring the state of wearing the safety equipment wearing according to the present disclosure, even if there is no safety manager on site who may detect and deal with a danger in advance, it is possible to take precautionary measure against a danger factor in the operation site, give warning to a worker performing a dangerous work in advance, and take emergency measure quickly even in the event of an accident.

The embodiments described above may be implemented in the form of a computer program that can be executed on a computer through various components, and such a computer program may be recorded on a computer-readable medium. At this time, the medium may include a magnetic medium such as a hard disk, a floppy disk and a magnetic tape, an optical recording medium such as a CD-ROM and a DVD, a magneto-optical medium such as a floptical disk, and hardware devices specially configured to store and execute program instructions, such as ROM, RAM, flash memory, etc.

The steps constituting the method according to the embodiments may be performed in an appropriate order unless an order is explicitly described or otherwise described. The present invention is not necessarily limited according to the order of description of the steps. The use of all examples or illustrative terms (e.g., etc.) in the present invention is merely for explaining the present invention in detail, and thus does not limit the scope of the present invention. Also, those skilled in the art can appreciate that various modifications, combinations and changes may be made within the scope of the claims or equivalents thereof.

Although the embodiments of the present invention have been described in detail above, the scope of the present invention is not limited thereto, and various modifications and improvements made by those skilled in the art in the field to which the present invention belongs also fall within the scope of the present invention.

What is claimed is:

1. A method for monitoring a state of wearing safety protective equipment, the method comprising:
   receiving an image from a site monitoring device installed at an operation site;
   determining whether a work performed in a monitoring area corresponds to a dangerous work by analyzing the image;
   detecting a target worker and a body area of the target worker when it is determined that the work corresponds to the dangerous work as a result of determining whether the work performed in the monitoring area corresponds to the dangerous work;
   determining a type of safety protective equipment required for the target worker based on the type of the dangerous work; and
   determining the state of the target worker wearing the safety protective equipment,
   wherein the dangerous work is separately classifying certain types of work with a high risk of accidents, and information about the type of work classified as the dangerous work is set in advance and stored in a database.

2. The method of claim 1, wherein:
   a body area of the target worker includes a head area and a body area, and
   the determining of the type of the safety protective equipment required for the target worker includes
   determining the type of the safety protective equipment required for each of the head area and the body area of the target worker.

3. The method of claim 1, wherein:
   the determining of the state of the target worker wearing the safety protective equipment includes
   determining the state of the target worker wearing the safety protective equipment at every moment when the target worker performs a work, accumulating and storing determination result data based on a result of the determination, and finally determining the state of the target worker wearing the safety protective equipment based on the accumulated determination result data.

4. The method of claim 3, wherein:
   the determining of the state of the target worker wearing the safety protective equipment further includes
   mapping information for determining the state of the target worker wearing the safety protective equipment to the target worker, and monitoring the target worker using a tracking algorithm.

5. The method of claim 1, further comprising:
   as a result of determining the state of the target worker wearing the safety protective equipment,
   when the state of the target worker wearing the safety protective equipment is inappropriate, transmitting an alarm to an output device.

6. The method of claim 1, wherein
   monitoring the state of wearing the safety protective equipment is performed using an artificial intelligence network, and
   the artificial intelligence network includes an object detection network, a classification network, and a decision making network.

7. A server for monitoring a state of wearing safety protective equipment, the server comprising:
   a communication circuit configured to receive an image from a site monitoring device installed at an operation site; and
   a processing circuit configured to
   determine whether a work performed in a monitoring area corresponds to a dangerous work by analyzing the image,
   detect a target worker and a body area of the target worker when it is determined that the work corresponds to the dangerous work as a result of determining whether the work performed in the monitoring area corresponds to the dangerous work,
   determine a type of safety protective equipment required for the target worker based on the type of the dangerous work, and
   determine the state of the target worker wearing the safety protective equipment,
   wherein the dangerous work is separately classifying certain types of work with a high risk of accidents, and information about the type of work classified as the dangerous work is set in advance and stored in a database.

8. The server of claim 7, wherein:
   a body area of the target worker includes a head area and a body area, and
   the processing circuit is configured to determine the type of the safety protective equipment required for each of the head area and the body area of the target worker.

9. The server of claim 7, wherein:
   the processing circuit is configured to determine the state of the target worker wearing the safety protective equipment at every moment when the target worker performs a work, accumulate and store determination result data based on a result of the determination, and finally determine the state of the target worker wearing the safety protective equipment based on the accumulated determination result data.

10. The server of claim 9, wherein:
    the processing circuit is configured to determine the state of the target worker wearing the safety protective equipment by mapping information for determining the state of the target worker wearing the safety protective equipment to the target worker, and monitoring the target worker using a tracking algorithm.

11. The server of claim 7, wherein:
    the processing circuit is configured to transmit an alarm to an output device when the state of the target worker wearing the safety protective equipment is inappropriate.

12. The server of claim 7, wherein
monitoring the state of wearing the safety protective equipment is performed using an artificial intelligence network, and
the artificial intelligence network includes an object detection network, a classification network, and a decision making network.

13. A system for monitoring a state of wearing safety protective equipment, the system comprising:
a site monitoring device installed at an operation site and configured to photograph an image;
an output device configured to notify a worker of a danger; and
a server configured to determine whether a work performed in a monitoring area corresponds to a dangerous work by analyzing the image, detect a target worker and a body area of the target worker when it is determined that the work corresponds to the dangerous work as a result of determining whether the work performed in the monitoring area corresponds to the dangerous work, determine a type of safety protective equipment required for the target worker based on the type of the dangerous work, determine the state of the target worker wearing the safety protective equipment, and transmit an alarm to the output device when the state of the target worker wearing the safety protective equipment is inappropriate,
wherein the dangerous work is separately classifying certain types of work with a high risk of accidents, and information about the type of work classified as the dangerous work is set in advance and stored in a database.

14. The system of claim 13, wherein:
a body area of the target worker includes a head area and a body area, and
the server is configured to determine the type of the safety protective equipment required for each of the head area and the body area of the target worker.

15. The system of claim 13, wherein:
the server is configured to determine the state of the target worker wearing the safety protective equipment at every moment when the target worker performs a work, accumulate and store determination result data based on a result of the determination, and finally determine the state of the target worker wearing the safety protective equipment based on the accumulated determination result data.

16. The system of claim 15, wherein:
the server is configured to determine the state of the target worker wearing the safety protective equipment by mapping information for determining the state of the target worker wearing the safety protective equipment to the target worker, and monitoring the target worker using a tracking algorithm.

17. The system of claim 13, wherein
monitoring the state of wearing the safety protective equipment is performed using an artificial intelligence network, and
the artificial intelligence network includes an object detection network, a classification network, and a decision making network.

* * * * *